United States Patent
Klein

(10) Patent No.: US 6,445,380 B1
(45) Date of Patent: Sep. 3, 2002

(54) KEYBOARD FOR DESKTOP AND PORTABLE COMPUTER

(76) Inventor: Jean-Michel Klein, 74, Avenue Parmentier, Paris (FR), 75011

( * ) Notice: Subject to any disclaimer, the term of this patent is extended or adjusted under 35 U.S.C. 154(b) by 0 days.

(21) Appl. No.: 09/468,063

(22) Filed: Dec. 20, 1999

Related U.S. Application Data

(63) Continuation of application No. PCT/FR98/01303, filed on Jun. 22, 1998.

(30) Foreign Application Priority Data

Jun. 23, 1997 (FR) .......................................... 97 07791

(51) Int. Cl.⁷ .......................... G09G 5/00; G06C 25/00; H03K 17/94; B41J 5/08
(52) U.S. Cl. ...................... 345/168; 235/145 R; 341/22; 400/486; 400/489
(58) Field of Search .................... 341/22, 23; 400/486, 400/489, 487; 361/680; 235/145 R; 345/168

(56) References Cited

U.S. PATENT DOCUMENTS

| | | | | |
|---|---|---|---|---|
| 4,615,629 A | * | 10/1986 | Power | 345/168 |
| 4,963,044 A | | 10/1990 | Warner | 400/486 |
| 5,476,332 A | * | 12/1995 | Cleveland, Jr. | 345/168 |
| 5,487,616 A | * | 1/1996 | Ichbiah | 400/489 |
| 5,620,267 A | | 4/1997 | Klauber | 400/486 |
| 5,905,493 A | * | 5/1999 | Belzer et al. | 400/487 |
| 6,118,432 A | * | 9/2000 | Kotorov et al. | 345/168 |

FOREIGN PATENT DOCUMENTS

WO  WO 88/00137  1/1988

OTHER PUBLICATIONS

Eisner, Andrew, Input Devices, Nov. 1990, Ziff–Davis Publishing Co., MacUser.*
Ford et al., Datadesk takes new approach to keyboard design, Sep. 11, 1990, Coastal Associates Publishing, MacWeek..*
Janus, Susan, Datadesk Makes Key Changes, Aug. 1990, Ziff–Davis Publishing Co., PC Computing.*
Seymour, Jim, Arguing over Keyboards Can Be a Touchy Subject, Sep. 10, 1990, Ziff–Davis Publishing Co., PC Week.*
Matskin, Jonathan, Grow Your Own Keybard with Datadesk's Innovative, Modular Switchboard, Sep. 11, 1990, Ziff–Davis Publishing Co., PC Magazine.*
SwitchBoard The User–Configurable Keyboard, Datadesk, Switchboard Product Line Brochure, fall 1991.*
"Input Device for OS/2", IBM Technical Disclosure bulletin, vol. 33, No. 11, p. 255 (Apr. 1991).
"Typing Keyboard Optimization for Hand–Held Computers", IBM Technical Disclosure Bulletin, vol. 37, No. 6B, pp. 227–229 (Jun. 1994).
PC World, p. 188 (May 1997).

* cited by examiner

*Primary Examiner*—Bipin Shalwala
*Assistant Examiner*—David L. Lewis
(74) *Attorney, Agent, or Firm*—Pennie & Edmonds LLP

(57) ABSTRACT

The invention relates to a keyboard for desktop and portable computers. The keys of the keyboard are disposed as a single block of rows of juxtaposed keys, laid out on top of one another, in that all numeric keys are grouped in a single compact zone integrated to the block. Thus, keys such as punctuation, calculation and direction keys are grouped by family of function, in compact zones integrated to the block. The invention can be used for computers and portables.

26 Claims, 5 Drawing Sheets

KEYBOARD FOR DESKTOP AND PORTABLE COMPUTER

CROSS-REFERENCE TO RELATED APPLICATION

This application is a continuation of International Application No. PCT/FR98/01303 filed Jun. 22, 1998.

TECHNICAL FIELD

The invention relates to a keyboard for desktop and portable computers, of a type including multiple character keys such as letters, digits, punctuations and accents, displacement keys, command of peripherals, and comprising notably a set of alphanumeric keys of typewriters, assorted keys for the execution of writing operations, and a set of numeric keys of calculators together with calculation keys, the whole of alphabetic keys being grouped in a compact central zone.

BACKGROUND ART

On known keyboards of this type, the set of keys characteristic of a typewriter and the set of keys characteristic of a calculator are arranged in separate parts of the keyboard. This keyboard therefore includes the main alphanumeric typewriter keyboard, a numeric keypad distanced from it, and a zone of arrowed keys providing the direction functions located between the main alphanumeric keyboard and the numeric keypad. To make the use of the keyboard as easy as possible, particularly in writing and calculating modes, despite the distance between the two parts, it was deemed necessary to keep for both the main alphanumeric keyboard and the numeric keypad all the assorted keys necessary for the execution of operations, thus creating doubles. Another consequence is that the keyboard includes two sets of numeric keys, one on the main alphanumeric keyboard and one on the specific numeric keypad.

This known configuration of the keyboard can be explained by the fact that during the evolution of typewriters towards more and more complex computing systems, able to perform more numerous and more sophisticated functions, the usual appearance of the keyboard was kept, while adding at each new step supplementary keys, for example under the form of separate blocks.

SUMMARY OF THE INVENTION

Existing keyboards then have the inconvenience of being very, bulky. This problem is particularly aggravating in the case of portable computers, which have limited space for the keyboard. The only known solution so far has been to suppress the numeric keypad.

The objective of the present invention is to offer a keyboard for desktop and portable computers that overcomes the, inconvenience here above enumerated.

BRIEF DESCRIPTION OF THE INVENTION

In order to reach this goal, the keyboard according to the invention is characterized in that all its keys are laid out as one single block of rows of juxtaposed keys, all the numeric keys being grouped in one compact zone integrated to the block, and the execution keys, such as displacement keys, being grouped by function families, in compact zones integrated to the said block.

The invention will be better understood, and its objectives, characteristics, details and advantages, will appear more clearly in the following explanatory description, referring to the annexed schematic diagrams, cited as mere examples illustrating several modes of realization of the invention, and in which.

DETAILED DESCRIPTION OF THE INVENTION

Figure 1:
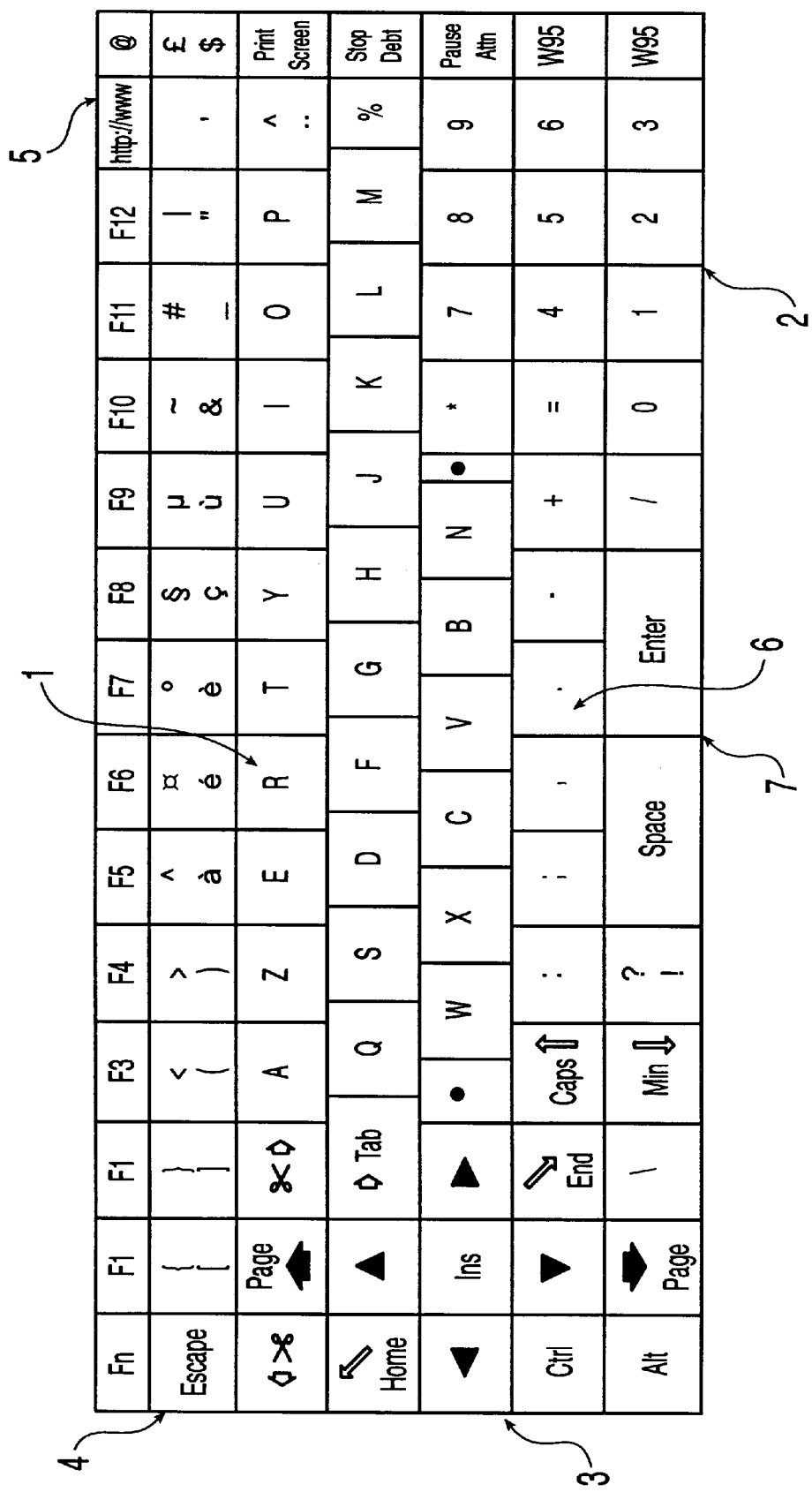
FIGS. 1 to 3 illustrate three modes of realization of a universal keyboard according to the invention, for alphabetic configurations of AZERTY, QWERTY and ABCDE types.

As shown by the figures, the four modes of realization of the invention, shown as mere, non limiting examples, have in common the facts that the keys are laid out in a single block of rectangular form, and that all duplicates are avoided. The different keys are defined in the usual way by known signs or symbols identifying them as such keys as alphabetic, numeric, various meanings such as national characters and accents, displacements symbolized by arrows, specific functions and command of peripherals. These keys and the functions to which they are destined being well known, there is no need to present them in detail.

As shown by the figures, the different keys are laid out in the form of seven horizontal rows of equal length, vertically juxtaposed, i.e. perpendicularly to the rows.

The keyboard according to the invention is composed of a plurality of main zones of keys, namely a compact central zone of alphabetic keys (zone 1), a compact zone of numeric keys (zone 2), integrated to the block and hereby located close to the alphabetic zone, a compact zone of arrowed direction keys (zone 3), a fourth zone (4) occupying mainly the first two rows and including function keys F1 to F12, and other qualifying and explantory keys such as parentheses, brackets, various signs such as national characters and accents, a fifth zone (5) occupying notably the right corner of the first row and the last column, related to Internet access, a sixth compact zone (6) of punctuation and calculation signs, located under the first zone (1) of alphabetic keys, and the SPACE and ENTER keys, well known but here placed side by side in the last row, the length of the SPACE key being shorter than usual. This disposition of the ENTER key allows it to be pressed by the thumb.

One notices that the compact zone 3 of displacement keys presents a general rectangular shape extending essentially on five rows and three columns. In the realization modes illustrated on FIGS. 1 to 3, this zone is located on the left of the central alphabetic zone 1, whereas, in the mode of realization illustrated on FIG. 4, it is located at the right of this zone 1 which is now moved to the left edge of the keyboard.

In this zone 3 the different one-step direction keys, each one symbolized by an plain triangle, surround the known INSERTION key. This zone includes, around this Insertion key (above, under, right and left), the four keys with plain triangles for one-step displacements in the indicated directions, and, located diagonally to the Insertion key, two keys with hollow slanted arrows, indicating the END and HOME displacements. At the top and bottom of this zone 3, in the middle column are located the PAGE UP and PAGE DOWN keys, and, on each side of the PAGE UP key, one can see the two keys representing the character erasures (forward and backward), symbolized by a pair of scissors and a small arrow indicating the direction of erasure.

Figure 2:
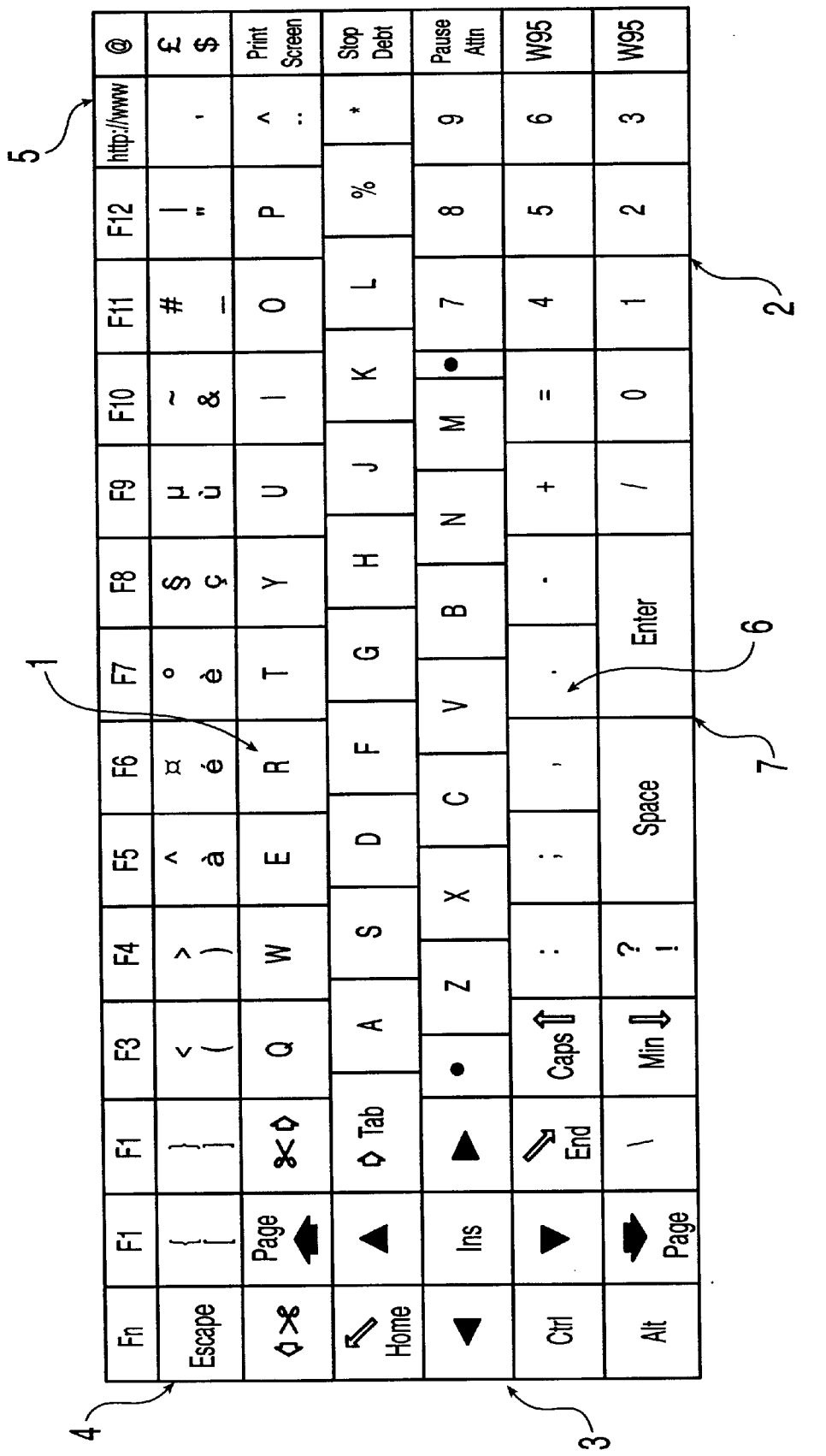
Figure 3:
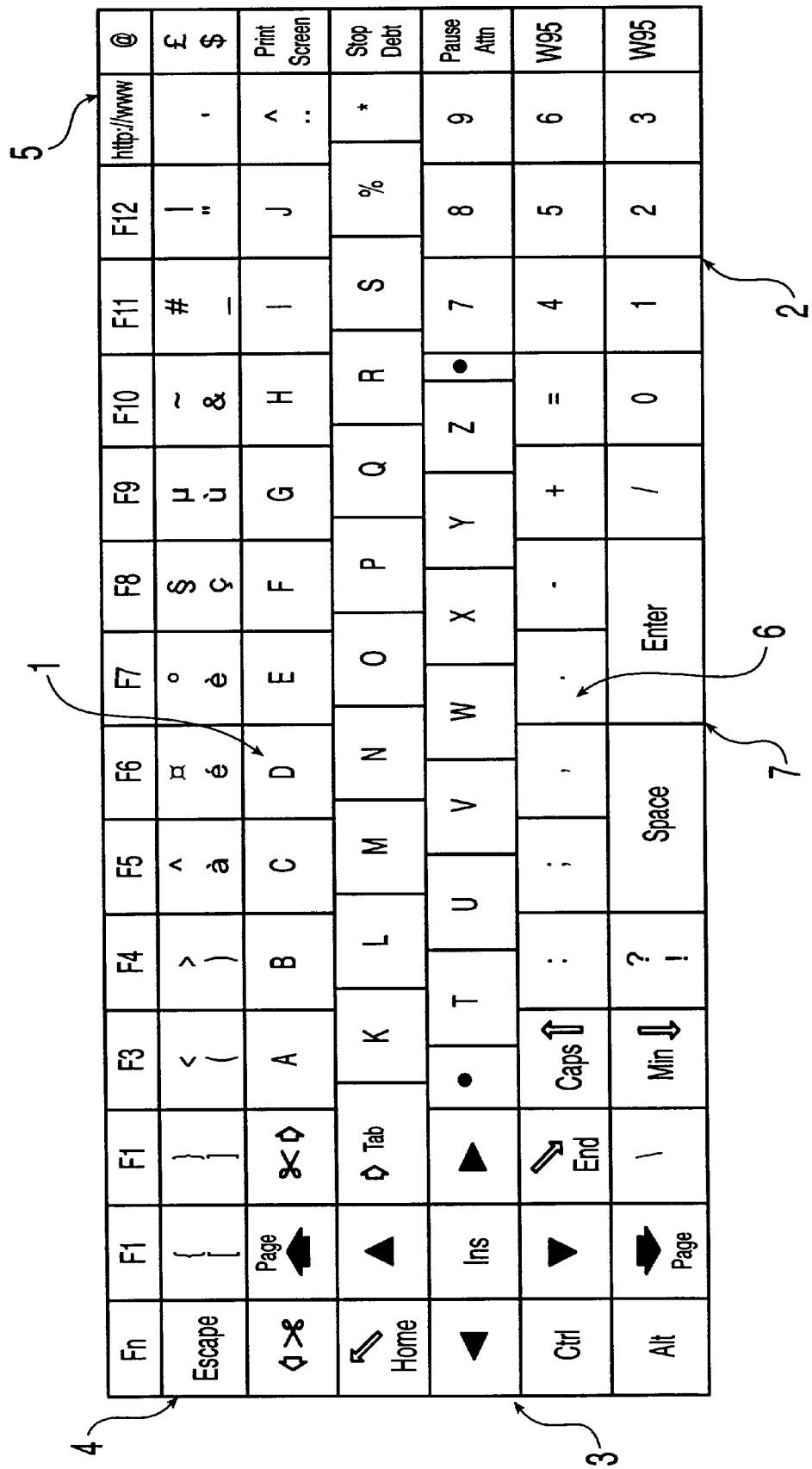
Figure 4:
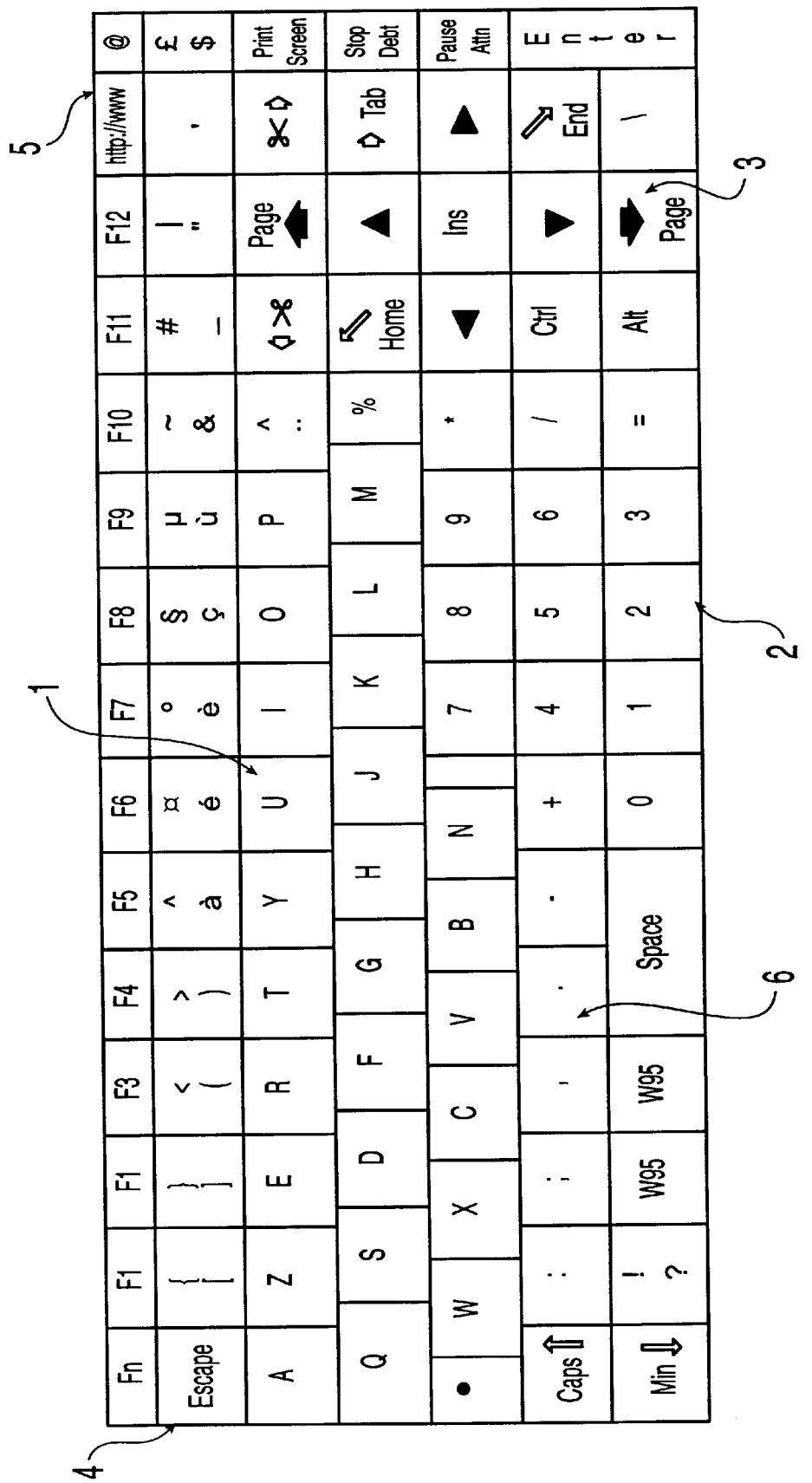
FIG. 4 shows a fourth mode of realization of the keyboard according to the invention, demonstrating another layout possibility of numeric and displacement key zones.

Zone 2 of numeric keys reproduces the traditional numeric keypad, and is located in the lower part of the keyboard, more or less under alphabetic zone 1; in the realization modes illustrated by FIGS. 1 to 3, it is located in the right part of the keyboard, and on FIG. 4, it is located more to the center, on the left side of displacement zone 3. On this figure, the ENTER key is located in the lower right corner, and special Operating System keys are located on the left of the SPACE key in the last row.

What comes out of the precedent description and figures is that, according to the invention, all keys belonging to the same mode of operation or same assorted functions are disposed in compact and neighboring zones, so that they can be used easily by the operator. This regrouping is not only advantageous functionally, but also ergonomically, as it enables to considerably reduce the footprint of the keyboard. The keyboard according to the invention can have a length of less than 30 cm, against 45 cm on existing keyboards, while, keeping the normal key size. Moreover the invention allows to eliminate all duplicates. Moreover, except on the second row, almost all keys have a unique function, which further facilitates the use of the keyboard.

The keyboard according to the invention includes free spaces at the left and/or right of the lower row of the alphabetic zone 1, that can be reserved for LED lights, symbolized by dots, allowing in particular to place the Caps Lock indicator in full visual field.

Of course, various modifications can be brought to the keyboard according to the invention, with the condition of respecting the principle here above described of the grouping of keys. For example it is possible to put at the bottom of the keyboard a pointing device and to locate the keys of the first row on either side of this pointing device.

Figure 5:
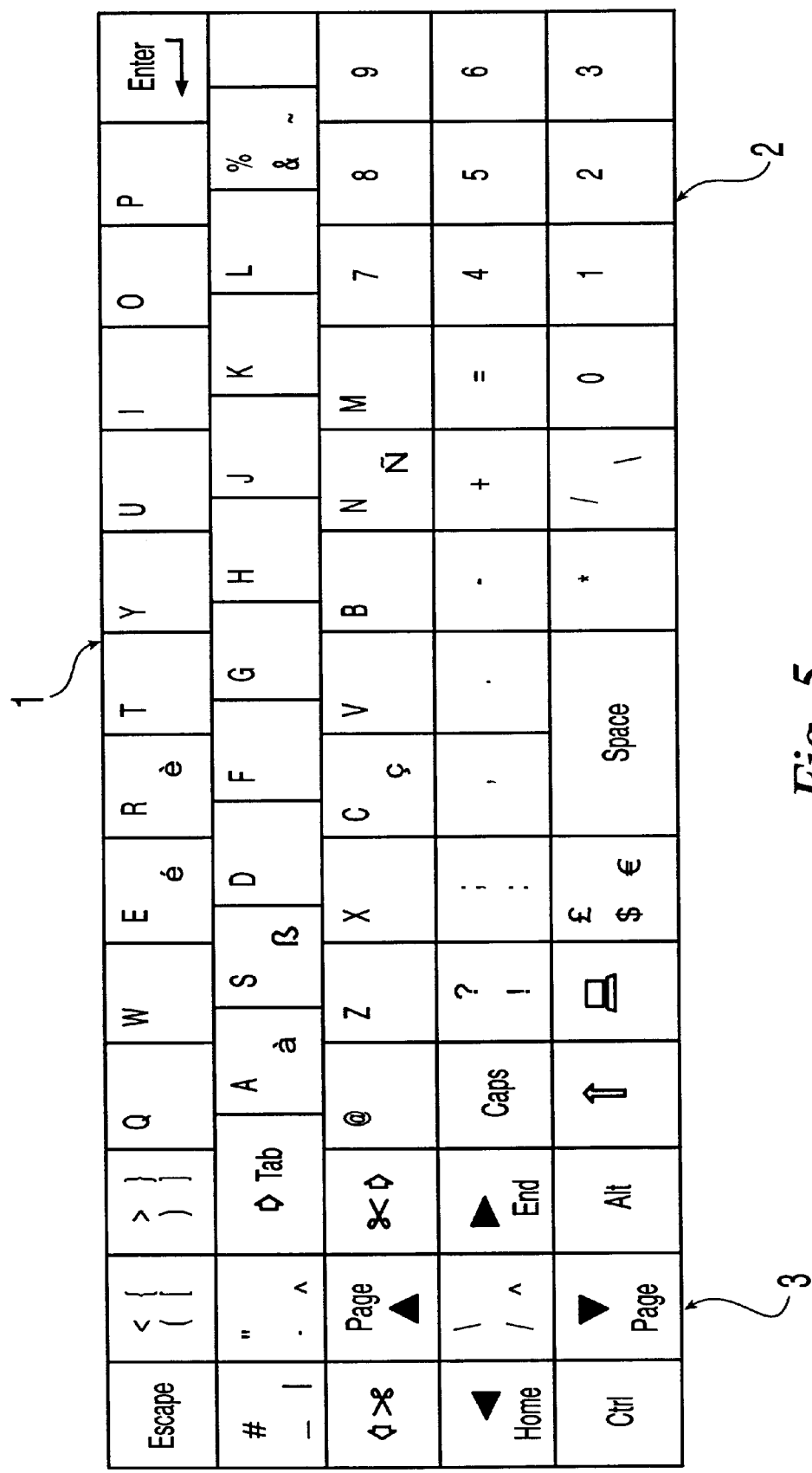
FIG. 5 shows a fifth mode of keyboard realization according to the invention, that can be used notably for pocket computers.

FIG. 5 shows a keyboard intended notably for pocket computers. One can see that the principle of the disposition of keys here above described for desktop and portable computers can also be transposed to the keyboards of pocket computers, without the first row of function keys, and with parentheses, brackets and various signs grouped on certain shared keys, able to perform several functions.

What is claimed is:

1. A keyboard for desktop and portable computers comprising a single block of juxtoposed keys forming a plurality of rows and columns, said block having a longitudinal axis extending in a parallel relationship to said rows and comprising a space key, an enter key, and a plurality of zones of keys, including at least
   a first zone having a plurality of alphabetic keys arranged in a standard configuration;
   a second zone having a plurality of numeric keys;
   a third zone having a plurality of displacement keys;
   a fourth zone of keys having a plurality of at least one of a function or qualifying or explanatory keys; and
   a fifth zone comprising punctuation and calculation sign keys;
   wherein each of said plurality of zone is integrated to said block with the first zone occupying portions of at least three parallel rows of said block,
   the second zone having the shape of a standard configuration of numeric keypads with at least three contiguous rows and three contiguous columns, the second zone being positioned adjacent to and at least partly substantially below said first zone,
   the third zone being positioned at least adjacent to said first zone, and
   the fifth zone being positioned adjacent to said first zone and said second zone.

2. A keyboard according to claim 1, wherein no keys are duplicated on the keyboard.

3. A keyboard according to claim 1, wherein at least one of said keys in the block is lighted, and said at least one lighted key is centrally located.

4. A keyboard according to claim 1, wherein at least the keys in the first, second, and third zones are associated with a single function.

5. A keyboard according to claim 1, wherein the space key is located in the bottom row of the block and has a length substantially equal to a length of two alphabetic keys.

6. A keyboard according to claim 1, wherein the enter key is located in the bottom row of the block and has a length substantially equal to a length of two alphabetic keys.

7. A keyboard according to claim 1, wherein the enter key is located in a peripheral column of the block, said enter key having a length substantially equal to a length of two alphabetic keys.

8. A keyboard according to claim 1, wherein the second zone is positioned in a lower corner of the block of keys.

9. A keyboard according to claim 8, wherein said second zone is positioned in a lower right corner of the block of keys.

10. A keyboard according to claim 1, wherein the standard configuration of the keys in the first zone is one of AZERTY, QWERTY, or ABCDE.

11. A keyboard according to claim 1, wherein the single block has a rectangular shape.

12. A keyboard according to claim 1, wherein the fourth zone occupies substantially the two top rows of the block.

13. A keyboard according to claim 1, wherein the qualifying and explanatory keys include at least one of parentheses keys, bracket keys, sign keys, accent keys, and national character keys.

14. A keyboard according to claim 13, further comprising a sixth zone, said sixth zone including internet access keys.

15. A keyboard according to claim 14, wherein said sixth zone is positioned in an upper right corner of the block.

16. A keyboard according to claim 1, wherein the enter key is positioned in a peripheral column on the right end of the block.

17. A keyboard of claim 1, wherein the space and enter keys are positioned adjacent one another substantially in the middle of the bottom row of the block of keys.

18. A computer keyboard comprising a substantially rectangular single block of juxtaposed keys, the block having a long dimension and a short dimension with the keys arranged in a plurality of rows extending along the long dimension, said block including:
   a space key;
   an enter key, and
   a plurality of zones of keys, including at least:
      a first zone having a plurality of alphabetic keys arranged in a standard configuration and occupying at least three parallel, contiguous rows, each alphabetic key bearing a corresponding letter printed thereon, said letter being oriented for reading along the long dimension;
      a second zone having a plurality of numeric keys arranged in at least three contiguous rows and three contiguous columns, the second zone being positioned adjacent to, and at least partly substantially below, said first zone; and a third zone having a plurality of displacement keys and being positioned adjacent to said first zone.

19. A keyboard according to claim 18, wherein the standard configuration of the keys in the first zone is one of AZERTY, QWERTY, or ABCDE.

20. A keyboard according to claim 18, further comprising a fourth zone of keys positioned above said first zone, said fourth zone including at least a plurality of function keys.

21. A keyboard according to claim 20, wherein the fourth zone further comprises at least one of qualifying and explanatory keys.

22. A keyboard according to claim 20, further comprising a fifth zone of keys, said fifth zone including at least one of punctuation or calculation keys.

23. A keyboard according to claim 22, further comprising a sixth zone, said sixth zone including internet access keys.

24. A keyboard according to claim 23, wherein said sixth zone is positioned in the upper right corner of the block.

25. A computer keyboard comprising a substantially rectangular single block of juxtaposed keys, the block having a long dimension and a short dimension with the keys arranged in a plurality of rows extending along the long dimension, said block including:

a space key;

an enter key, and a plurality of zones of keys, including at least:

a first zone having a plurality of alphabetic keys arranged in a standard configuration and occupying at least three parallel, contiguous rows, each alphabetic key bearing a corresponding letter printed thereon, said letter being oriented for reading along the long dimension;

a second zone having a plurality of numeric keys arranged in at least three contiguous rows and three contiguous columns, the second zone being positioned adjacent to, and at least partly substantially below, said first zone;

a third zone having a plurality of displacement keys and being positioned adjacent to said first zone;

a fourth zone of keys positioned above said first zone and occupying substantially the two top rows of the block, said fourth zone including a plurality of function keys;

a fifth zone of keys adjacent to both said first zone and said second zone, said fifth zone including at least one of punctuation and calculation keys; and a sixth zone comprising at least one internet access key;

wherein no keys are duplicated on the keyboard.

26. A keyboard according to claim 25, wherein said sixth zone is positioned in the upper right corner of the block.

* * * * *